United States Patent
Haunstein et al.

(10) Patent No.: US 7,130,341 B2
(45) Date of Patent: Oct. 31, 2006

(54) FEED FORWARD EQUALIZER CONTROLLED BY FEC CORRECTION RATES

(75) Inventors: Herbert Haunstein, Nuremberg (DE); Ralph Schlenk, Erlangen (DE); Konrad Sticht, Eschenbach (DE)

(73) Assignee: Lucent Technologies Inc., Murray Hill, NJ (US)

( * ) Notice: Subject to any disclaimer, the term of this patent is extended or adjusted under 35 U.S.C. 154(b) by 783 days.

(21) Appl. No.: 10/244,307

(22) Filed: Sep. 16, 2002

(65) Prior Publication Data

US 2003/0067974 A1    Apr. 10, 2003

(30) Foreign Application Priority Data

Oct. 9, 2001    (EP)    ................... 01308632

(51) Int. Cl.
*H03H 7/30*    (2006.01)
*H03H 7/40*    (2006.01)
*H03K 5/159*    (2006.01)

(52) U.S. Cl. ............. 375/229; 375/236; 375/230

(58) Field of Classification Search ............. 375/229, 375/236, 230

See application file for complete search history.

(56) References Cited

U.S. PATENT DOCUMENTS 5,164,961 A * 11/1992 Gudmundson ............ 375/229
5,237,588 A *  8/1993 Tanaka et al. ............ 375/230

FOREIGN PATENT DOCUMENTS

EP    0 808 046 A    11/1997

OTHER PUBLICATIONS

Proakis, "*Digital Communications*", 1995, McGraw-Hill, New York, US, Section 11-2.

* cited by examiner

*Primary Examiner*—Chieh M. Fan
*Assistant Examiner*—Anna Ziskind

(57) ABSTRACT

A method of signal equalization of a transmitted bit stream by means of a feed forward equalizer is provided, whereby the signal is decomposed into at least two components and the components are multiplied with equalization parameters to form equalized components, which are superposed to form an equalized signal, and whereby conditional bit error rates by counting faulty transmitted bits in dependence of preceding and succeeding bits are determined and the equalization parameters are tuned dependent on the determined conditional bit error rates.

7 Claims, 8 Drawing Sheets

FEED FORWARD EQUALIZER CONTROLLED BY FEC CORRECTION RATES

CROSS REFERENCE TO RELATED APPLICATION

This application claims priority of European Application No. 01308632.7 filed on Oct. 9, 2001.

FIELD OF THE INVENTION

The invention relates to a method for signal equalization in a signal receiving unit comprising a feed forward equalizer, in particular to the adjustment of equalization parameters used to equalize the received signals and to a feed forward equalizer adapted to carrying out the adjusting method.

BACKGROUND OF THE INVENTION

In long distance transmission systems at high bit rates over optical fibers, signal distorting effects occur which reduce the eye opening at the receiver. The distortion may be due to linear or non-linear effects, such as group velocity dispersion (GVD), polarization mode dispersion (PMD), transmitter chirp, extinction ratio, or intersymbol interference (ISI) induced by non-linearities of the fiber. These effects reduce the eye opening at the receiver and thereby lead to a reduced tolerable optical signal to noise ratio (OSNR), which is crucial for optically amplified systems.

In the optical receiver, the optical power is converted back into electrical signals. The digital data and sampling clock phase has to be derived from the analog signal by means of a clock and data recovery circuitry (CDR).

In order to improve the signal quality at the CDR circuit, it is known to apply adaptive equalization. A well known adaptive equalizer is the Feed Forward Equalizer (FFE) for a compensation of the transmission channel. In a FFE, the signal is equalized by means of a weighted sum of a tapped delay line.

The adaptation of the tap weights requires information about the analog signal. The information is utilized to estimate the channel model and/or for the calculation of the equalizer parameters.

It is known in the art to use a full speed analog to digital conversion (ADC) or a sample and hold circuit with an additional ADC, which is working at a lower speed.

An alternative method for a determination of the tap weights is based on measurement of pseudo errors at additional variable thresholds. The control algorithm has to vary and adapt equalization parameters by means of a deterministic procedure, e.g. by a least mean square algorithm (LMS) or by dithering and evaluation of the direction of improvement.

The major problem for the generation of a control signal is the realization of a high speed sample and hold circuit to sample the analog signal or the implementation of an "eye monitor", which may be understood as additional threshold with an exclusive-or-function of the current threshold. The output pulses counted at the exclusive-or-gate (EXOR-gate) correspond to the number of the different decisions. Those parallel comparator structures always exhibit performance degradation since the generation of an analog signal is always distorted by various parasitic elements of the circuitry. Using a pseudo error counter instead is disadvantageous since the data rate is doubled which results in an increased power consumption of the output interface.

The data stream transmitted may include a forward error correction code (FEC) which improves the bit error rate (BER) for a given signal-to-noise ratio (SNR) by reducing stochastic distortions from optical or electrical noise and cross talk. For high bit rate transmission, FEC is becoming more and more mature to increase the tolerable SNR on long haul transmissions. In encoding for forward error correction, redundant bits are added to a bit stream so that errors may be detected and corrected at the far end. The number of added bits may equal the number of signal bits, resulting in a doubling of the data transmission rate for a given channel. However, in many cases redundant transmission by using FEC is beneficial due to a guaranteed low error rate.

Different FEC-Coding-Schemes are used, such as so called in band or out band, BCH (Bose-Chaudhury-Hoequengheen) or RS (Reed-Solomon) codes which fit for Sonet/SDH digital wrapper formats. If the input error rate of the data stream is below the error correction capability of the respective error correction code, the bit errors can be corrected and estimates of a bit error ratio (BER) may be measured by using the additional information from the respective FEC-decoding scheme. Specifically, the number of errors that can be corrected amount to $(d-1)/2$, where d denotes the minimum number of bit positions by which code words for a particular code are different ("Hamming distance").

SUMMARY OF THE INVENTION

It is the object of the present invention to simplify the generation of a control signal for signal equalization by utilizing information provided by the forward error correction.

The inventive solution is defined in the independent claims.

According to claim 1, a method of signal equalization of a transmitted bit stream by means of a Feed Forward Equalizer is provided, comprising the steps of decomposing said signal into at least two components, multiplying the components with equalization parameters to form equalized components, composing an equalized signal by superposition of said equalized components, estimating conditional bit error rates by counting faulty transmitted bits in dependence of preceding and succeeding bits, and tuning said equalization parameters in dependence of the estimated conditional bit error rates.

The parameters or coefficients may be positive or negative and are tuned, so as to maximize the eye opening of the transmitted signal.

According to a preferred embodiment, the signal is decomposed into at least three components, which are delayed with respect to each other and are multiplied by independent tunable parameters or coefficients and are then superimposed to form the equalized signal. Accordingly, the step of decomposing the signal comprises the step of decomposing the signal into at least three components, which are delayed with respect to each other, and the step of tuning the equalization parameters comprises the step of independently tuning the parameters.

It is advantageous to adapt or tune the parameters additionally in dependence of the overall BER. Specifically, if a high BER is detected, the variation of the parameters is enlarged in order to increase the adaptation speed. In turn, the adaptation speed or variation of the parameters may be smaller, if a low BER is detected. Accordingly, a method is provided, wherein the step of tuning the equalization parameters comprises the step of varying the amount of said parameter in dependence of the detected bit error rate, in particular increasing the amount if a high bit error rate is detected and decreasing the amount if a low bit error rate is detected.

According to an easily implementable embodiment, the conditional bit error rates are determined with respect to the adjacent preceding and succeeding bits. In considering those bit triples (preceding, center and succeeding bit), eight different bit patterns are possible. Preferably, four sets of bit triples may be formed. A first set and a second set are defined by triples, wherein preceding bit and center bit are equal or different, respectively. Analogously, third and forth sets are defined by triples, wherein center bit and succeeding bit are, respectively, equal or different. The conditional error rates are estimated with respect to detected errors of the center bit and may be assigned to the above mentioned four sets of bit triples. The signal is split into three components or signals, which are delayed with respect to each other. Preferably, the signal delay is equal to the clock cycle.

In the FFE, the signals are independently multiplied by parameters or coefficients and superimposed after multiplication to form an equalized signal. The coefficient to be multiplied with the first transmitted signal having the smallest delay is decreased if the error rate of center bits of the third set of bits is smaller than the center bit error rate of the forth set of bit triples and is vice versa increased in the case that the error rate in the first set exceeds the error rate in the second set.

Accordingly, the coefficient to be multiplied with the last transmitted signal having the largest delay is decreased if the error rate of center bits of the first set of bits is smaller than the center bit error rate of the second set of bit triples and is increased in the case that the error rate in the first set exceeds the center bit error rate in the second set. In other words, a conditional error is assigned to each of the set of triples defined above. If the difference of the conditional errors assigned to the first and second sets of triples is negative, the coefficient of the signal or component having the largest delay is increased. The coefficient is decreased, if the difference becomes positive. Also, the coefficient to be multiplied with the component having the largest delay is decreased. Thus, in accordance with the preferred embodiment, a method is provided, wherein the step of decomposing comprises the step of decomposing the signal into three components. Further, it is contemplated that the step of estimating comprises the steps of determining a first conditional error rate, whereby the values of the preceding bits are equal to the values of the faulty transmitted bits, determining a second conditional error rate, whereby the values of the preceding bits are different from the values of the faulty transmitted bits, determining a third conditional error rate, whereby the values of the succeeding bits are equal to the values of the faulty transmitted bits, and determining a fourth conditional error rate, whereby the values of the succeeding bits are different from the values of the faulty transmitted bits.

The step of tuning the parameters comprises the steps of increasing the parameter to be multiplied with the signal of said three signals having the smallest delay if the fourth conditional error is smaller than said third conditional error and decreasing said parameter if the fourth conditional error is larger than the third conditional error. Analogously, the parameter to be multiplied with the signal of the three signals having the largest delay is increased if the second conditional error is smaller than the third conditional error and decreased if the second conditional error is larger than said first conditional error.

The invention also contemplates provision of a receiver adapted to equalize signals of a transmitted bit stream which comprises a feed forward equalizer. The equalizer comprises a decomposing means to decompose the is signal into at least two components, a multiplying means to multiply the components with independently tunable equalization coefficients, and a superimposing means to superimpose the components to form an equalized signal, whereby the equalizer is additionally provided with forward error correction means adapted to detect faulty transmitted bits, a conditional error counter which determines conditional bit error rates by counting faulty transmitted bits in dependence of preceding and succeeding bits, and a tuning means adapted to tune the equalization coefficients dependent on the conditional bit error rates.

According to a preferred embodiment, the decomposing means further comprise delay means for time delaying said at least two components with respect to each other.

The receiver can be advantageously improved if the tuning means comprise means for retrieving the total bit error rate and means for controlling the amount of variation of the equalization parameters dependent on the total bit error rate. According to a preferred embodiment, the signal is decomposed into three components, and the conditional error counter determines a first conditional error rate of faulty transmitted bits, whereby the values of the preceding bits are equal to the values of the faulty transmitted bits, a second conditional error rate of faulty transmitted bits, whereby the values of the preceding bits are different from the values of the faulty transmitted bits, a third conditional error rate of faulty transmitted bits, whereby the values of the succeeding bits are equal to the values of the faulty transmitted bits, and a fourth conditional error rate of faulty transmitted bits, whereby the values of the succeeding bits are different from the values of the faulty transmitted bits.

It is advantageous to increase the parameter to be multiplied with the signal having the smallest delay among the three signals if the fourth conditional error is smaller than the third conditional error and decrease the parameter if the fourth conditional error is larger than the third conditional error, and to increase the parameter to be multiplied with the signal having the largest delay among the three signals if the second conditional error is smaller than the third conditional error and decrease the parameter if the second conditional error is larger than the first conditional error.

BRIEF DESCRIPTION OF THE DRAWINGS

The invention is described in more detail below in view of preferred and most preferred embodiments and reference is made to the accompanying drawings, in which.

DETAILED DESCRIPTION OF THE PREFERRED EMBODIMENTS

Figure 1:
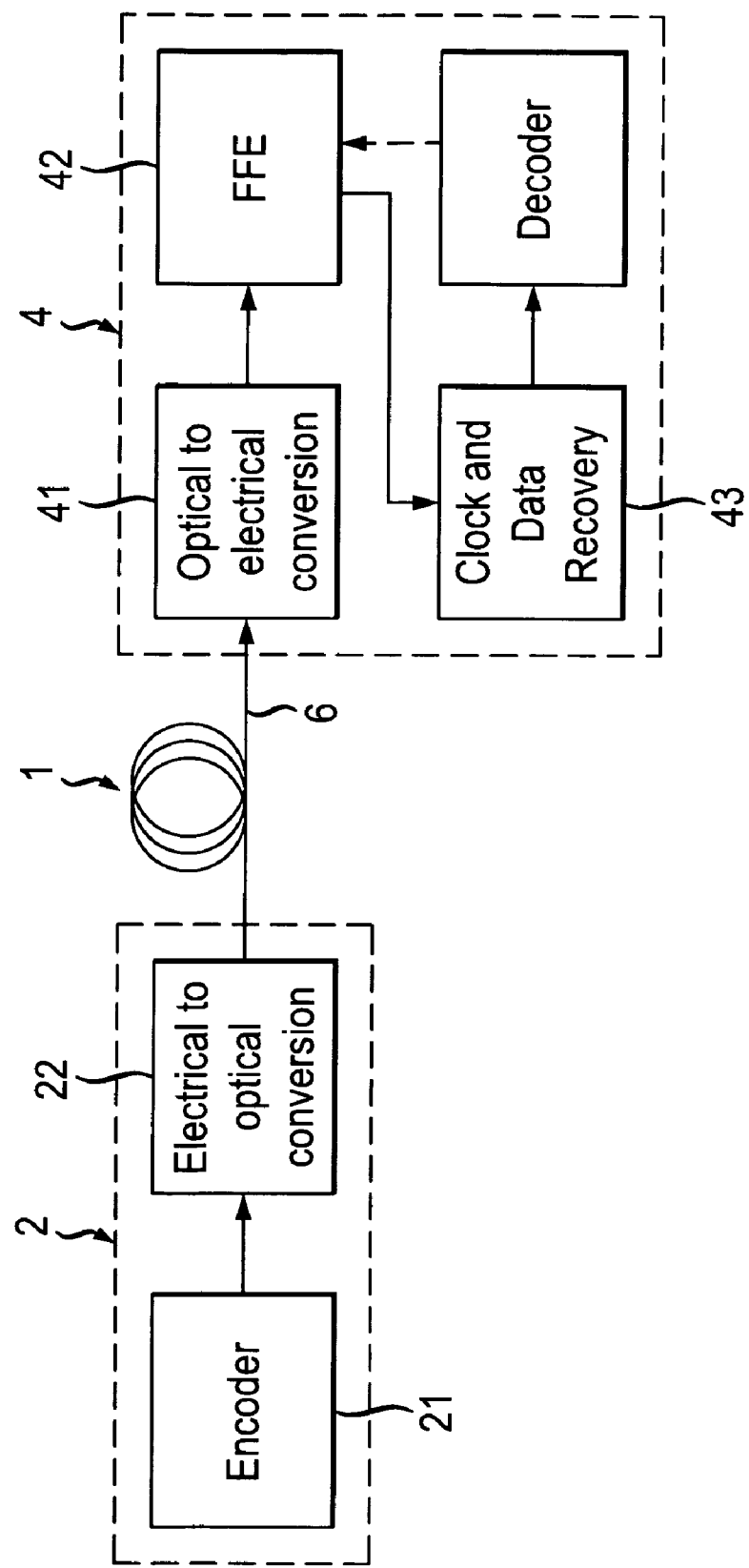
FIG. 1 is an illustration of components of an optical transmission channel.

Reference is now made to FIG. 1 showing components of an optical transmission channel 1. The channel comprises a transmitter 2, which includes an encoder 21 to encode the data stream for FEC and an electrical to optical converter 22 to convert the electrical signals for optical transmission. The encoded and converted data stream is transmitted via an optical fiber. A receiver 4 retrieves the data from the received optical signals. In order to retrieve the data, the received optical signals are converted back to electrical signals by means of a converter 41. It is further necessary to retrieve the clock and sampling phase from received signal, which is generally carried out by means of a clock and data recovery circuit 43. Data are recovered in a decoder, wherein the converted analogue signal is digitised to a bit stream by means of a signal threshold or decision threshold and the recovered clock and sample phase. Finally, a decoding scheme is applied to the bit stream to retrieve the data that have been FEC-coded by encoder 21.

However, the encoded bit stream may contain bit errors due to noise generated in the transmission line or distortions caused by non-linearities of the optical transmission and the circuitry involved. If the number of bit errors does not exceed a certain number which depends on the redundancy added by FEC-coding, the bit errors can be corrected.

The signal quality can be increased by inserting a feed forward equalizer 42 to at least partly compensate transmission induced signal distortions and to maximize the eye opening of the received signals.

Figure 2:
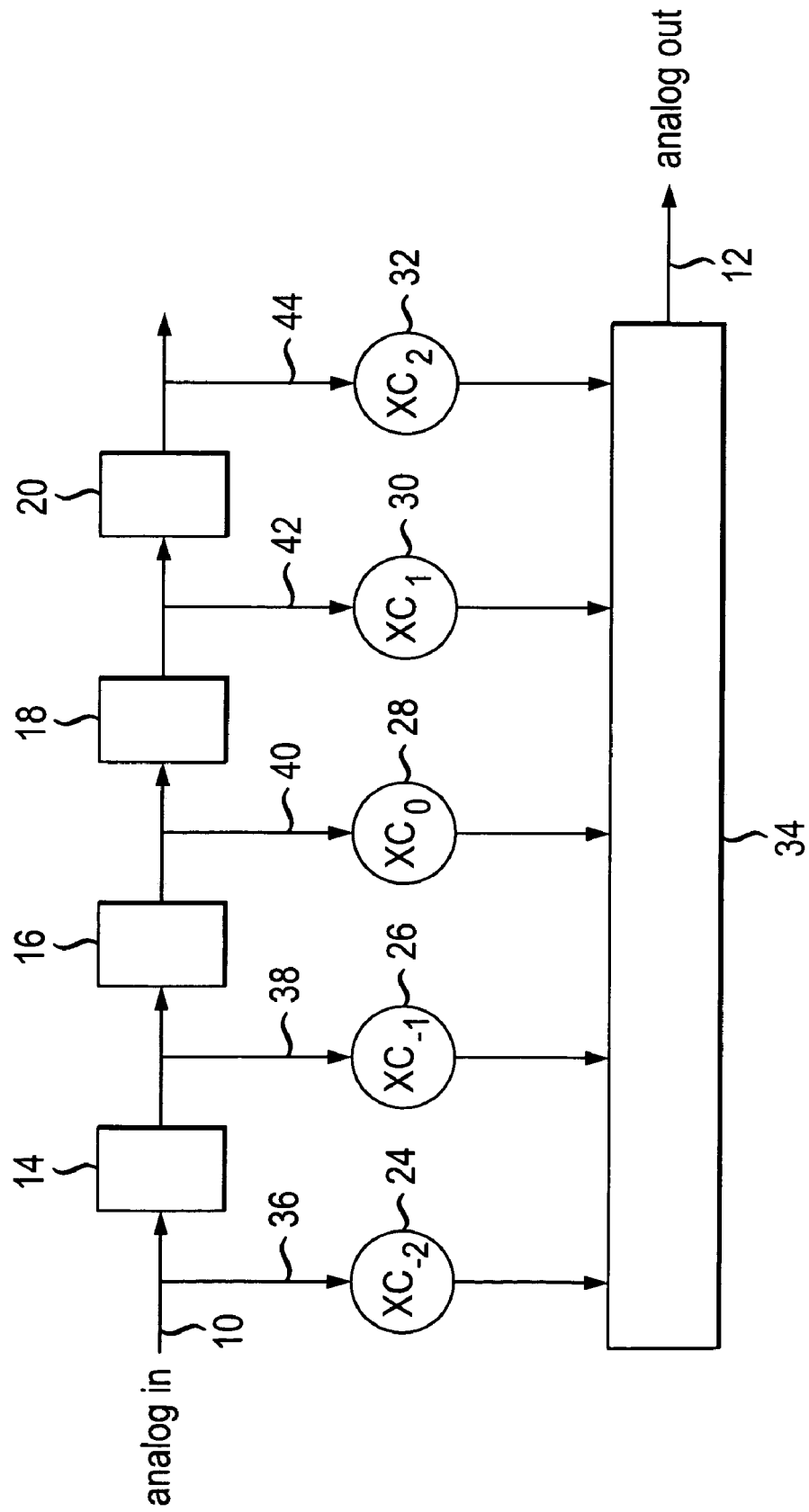
FIG. 2 depicts a schematic diagram of a feed forward equalizer according to a preferred embodiment of the invention.

Reference is now made to FIG. 2 showing a schematic of a FFE. In this embodiment, the incoming signal is split into five signals or components by means of taps 36, 38, 40, 42 and 44 which are tapped from the incoming signal line 10. The signals are delayed with respect to each other by means of delay lines 14, 16, 18 and 20 located intermediately between the taps. Each of the signals is processed by multiplying means 24, 26, 28, 30 and 32, whereby the signals are independently multiplied or weighted by factors or coefficients $c_{-2}$, $c_{-1}$, $c_0$, $c_1$, and $c_2$. A superposition of the weighted components is generated in superimposing means 34 and passed to the output line 12.

In general, the distortions of the incoming signals are not constant in time. Thus, the coefficients need to be adapted to achieve the best possible equalization. The direction and amount of tuning of the parameters is determined by conditional bit error rates. For this purpose, a conditional bit error counter is contemplated in the decoder 44 of the receiver 4 shown in FIG. 1.

Figure 3:
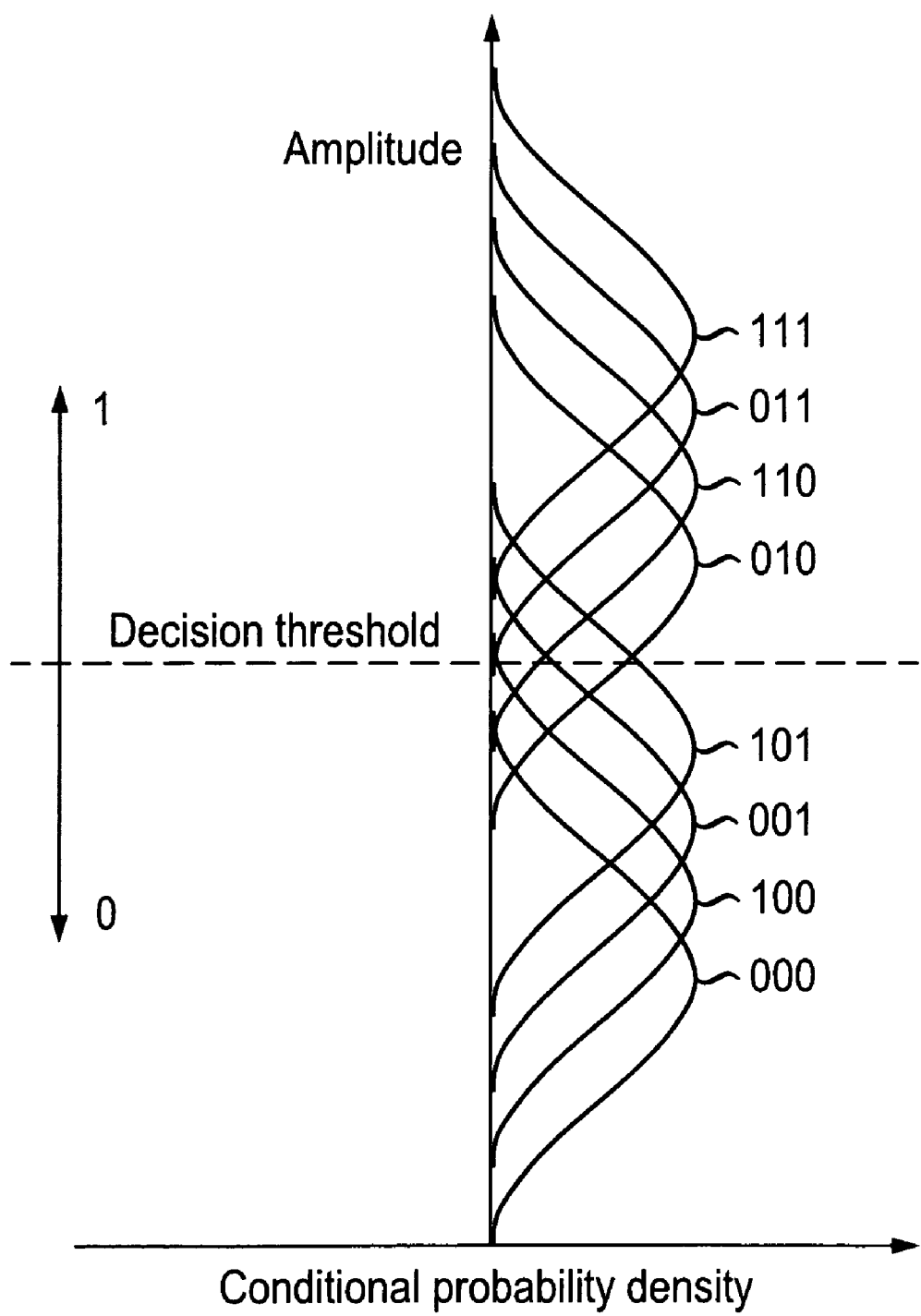
FIG. 3 shows conditional probability densities of bit patterns in dependence of the detected amplitude.

In general, the conditional bit error rates are additionally dependent on the transmitted bit pattern. FIG. 3 shows conditional probability densities of bit patterns in dependence of the detected amplitude. The conditional probability densities for the eight different bit triples at the decision threshold are indicative for the probability of faulty bit transmission of the center bit. Due to signal noise and various distortions caused by the characteristics of the transmission line, which may also be pattern dependent, a distribution of signal amplitudes for each of the bit patterns is received, whereas the probability density distribution denotes the normalized signal distribution. A bit value will be identified as One if the amplitude exceeds the decision threshold and as Zero, if the amplitude is lower than the threshold. As can be seen from the graphs depicted in FIG. 3, the bit patterns 010 and 101 have the largest probability densities at the decision threshold causing the center bit of these patterns to have the largest error probabilities among the eight different bit triples.

Figure 4:
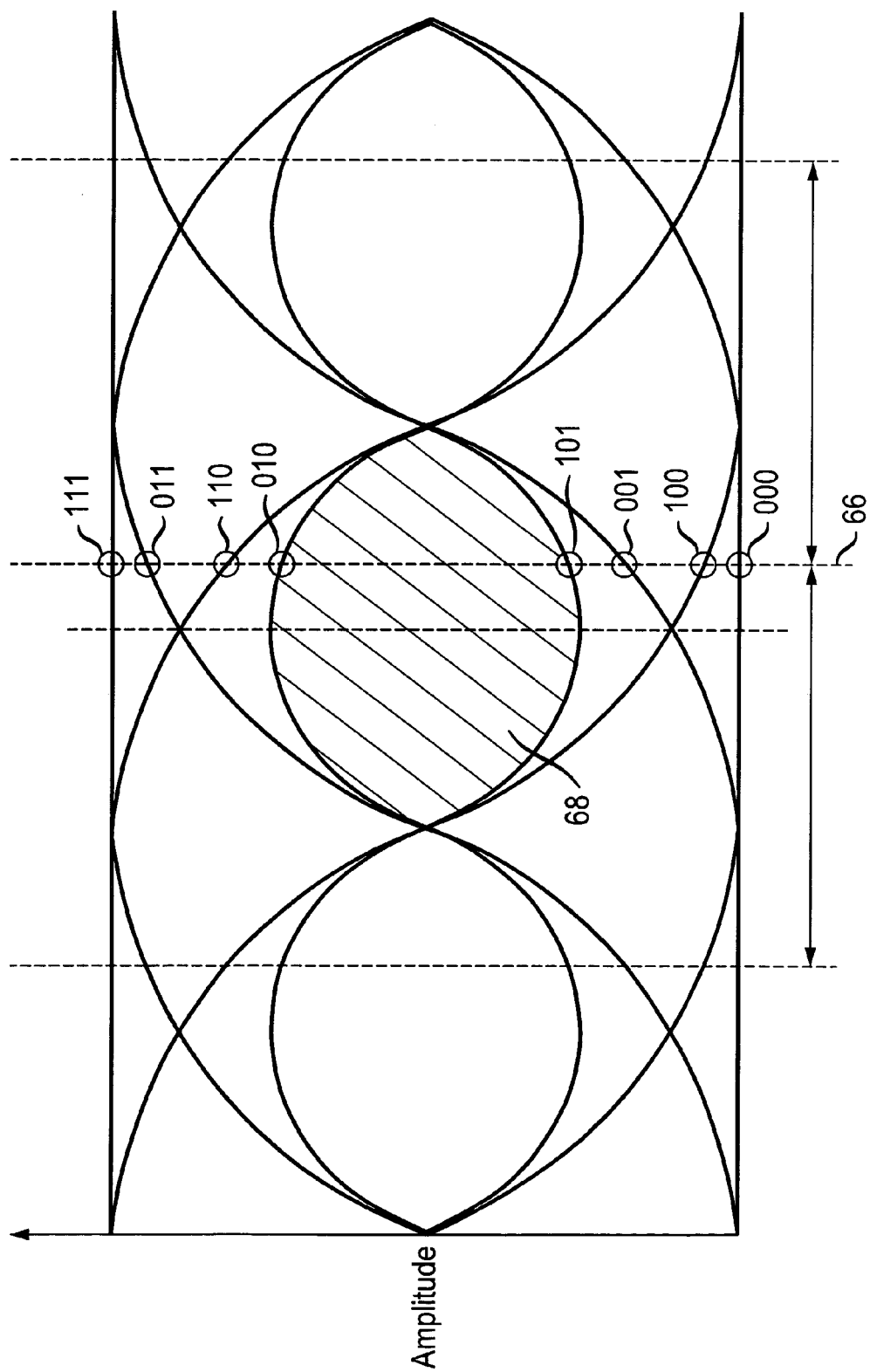
FIG. 4 shows an eye diagram of a distorted signal.

FIG. 4 shows an eye diagram of a distorted signal. Compared to an optimum eye diagram, a distortion causes bit pattern dependent deviations in the transitions from ones to zeros and vice versa. Tuning the equalization parameters according to the present invention therefore aims to equalize the signals such that the eye opening 68 is maximized. Ideally, the eye opening should be as large as the maximum amplitude. Consequently, the signal waveform is altered so that the signal amplitudes for the transitions 010, 110, 011 and 111 as well as for the transitions 000, 100, 001 and 101 coincide at the sampling point 66, which has been determined by the CDR circuit.

Referring back to FIG. 3, this aim is equivalent to a minimization of the width of the conditional probability densities so that the probability density for each bit pattern is zero at the decision threshold.

Figure 5:
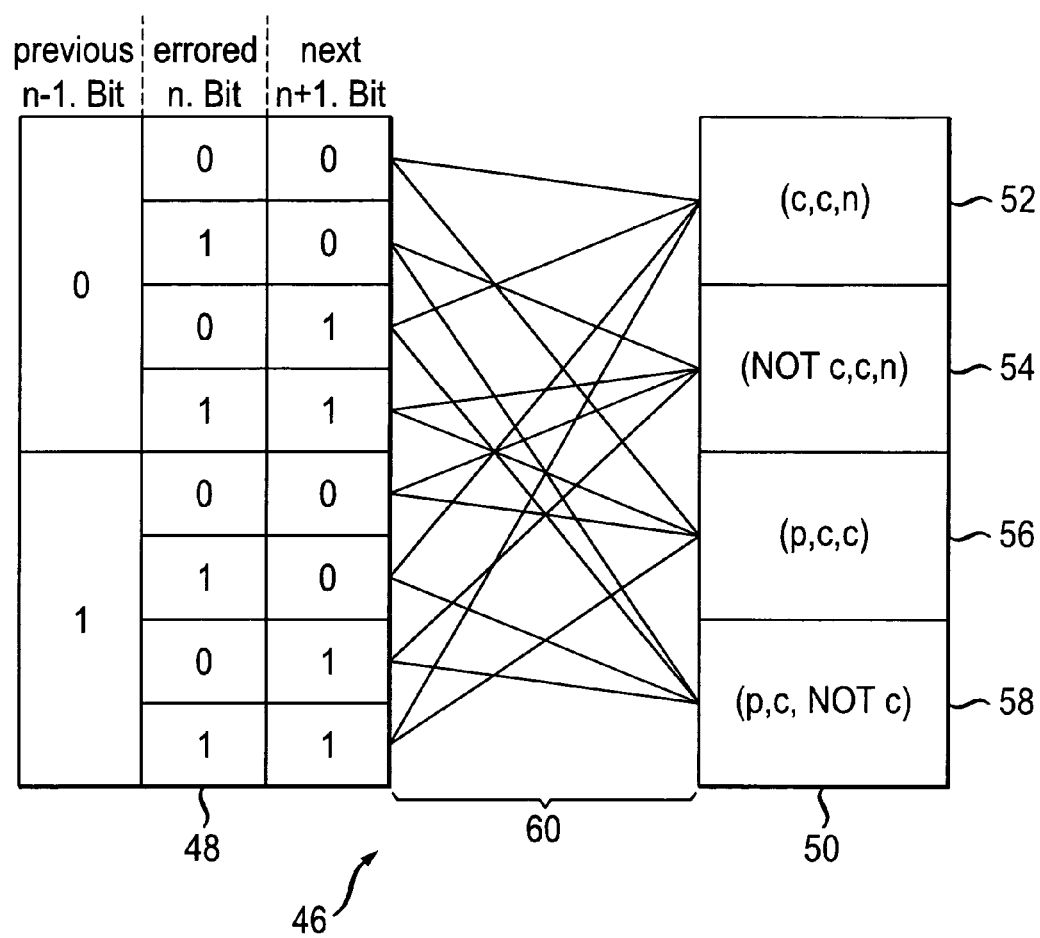
FIG. 5 illustrates conditional error counters suitable for tuning three parameters.

Reference is now made to FIG. 5 which illustrates the operation of a conditional error counter 46 suitable for tuning three parameters $c_{-1}$, $c_0$ and $c_1$ in the case of a FFE comprising three taps.

A look-up table 48 shows eight different bit triples. The conditional error counter 46 comprises a counter 50, wherein four conditional error rates are stored in registers 52, 54, 56 and 58. In FIG. 5, the conditional errors are denoted as (c,c,n), (NOT c,c,n), (p,c,c) and (p,c,NOT c), whereby p, c and n denote previous, corrected and next bit, respectively. Specifically, (c,c,n) comprises errors, wherein a transmission error of the center bit of a bit triple occurred and has been corrected, and wherein the previous bit value is equal to the value of the corrected bit. It has to be noted that the value of the corrected bit refers to the intended or corrected value but not the value which was erroneously determined by the receiver due to faulty transmission. Accordingly, (NOT c,c,n) denotes errors, wherein the previous bit value is different from the value of the corrected center bit. As well, (p,c,c) and (p,c,NOT c) denote bit triples, wherein the next bit values are equal or different, respectively.

In FIG. 5, the assignment of bit triples shown in the look-up table to the registers 52, 54, 56 and 58 is illustrated by means of connecting lines 60.

For example, if the center bit of the bit triple (1,1,0) has been corrected, the registers 52 and 58 will be incremented. After a certain time, for example after a predetermined number of clock cycles, the registers 52 to 58 are evaluated and cleared.

The parameters or coefficients $c_{-1}$, $c_0$ and $c_1$ then have to be adapted or tuned dependent on differences of the conditional errors in order to maximise the eye opening as described in the following. In the case that the is number of corrected (c,c,n)-triples is smaller than the number of corrected (NOT c,c,n)-triples, the coefficient $c_1$ has to be decreased. In the reverse case, if the first number exceeds the latter, $c_1$ will be increased. Analogously, the coefficient c−1 will be decreased, if the number of corrected (p,c,c)-triples is smaller than the number of corrected (p,c,NOT c)-triples and will be increased if the first number exceeds the latter.

Figure 6A:
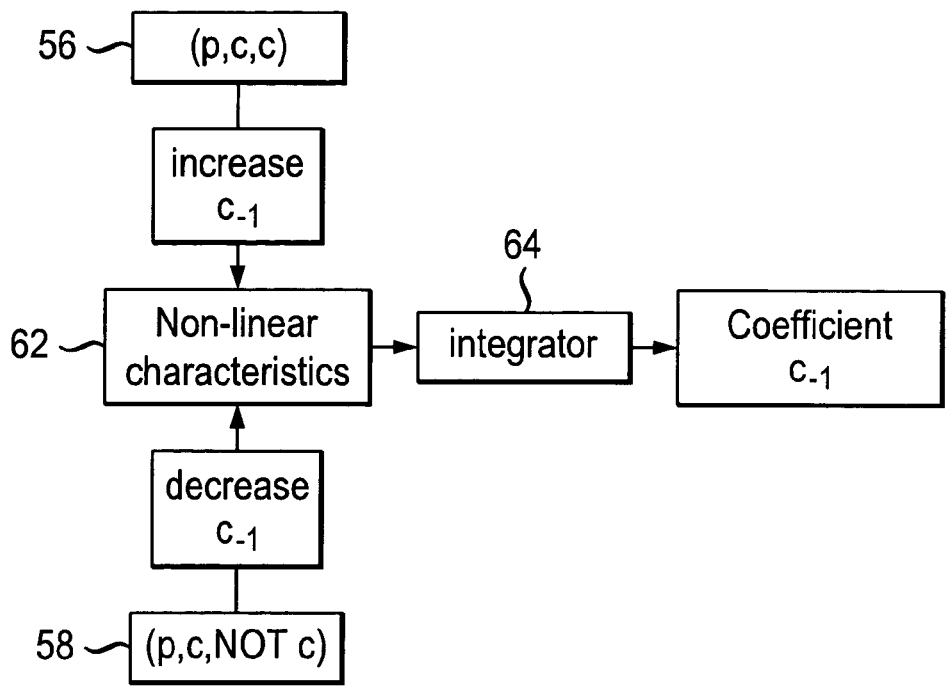
FIGS. 6A and 6B illustrate the mechanism of adapting or tuning equalization parameters depending on conditional bit error rates.
Figure 6B:
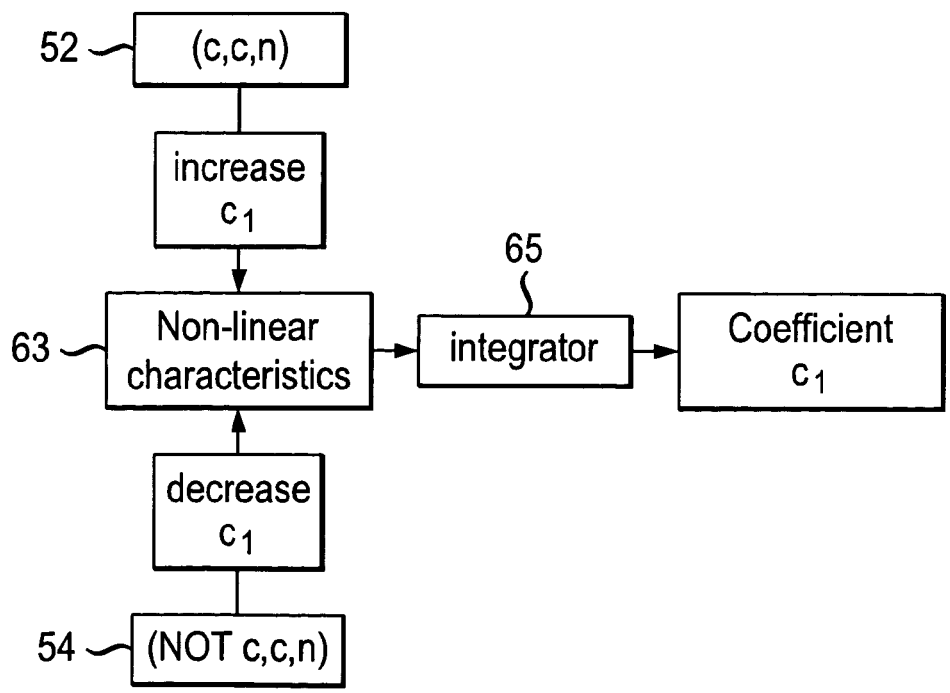

Reference is now made to FIGS. 6A and 6B which illustrate the mechanism of adapting or tuning the equalization parameters depending on the conditional bit error rates.

The contents of the registers 52 to 58 are handed to a circuit 62, wherein the contents of the registers are counterbalanced to lower or raise coefficients $c_{-1}$ and $c_1$. Transmission errors summed up in registers 52 or 56 tend to raise $c_1$ or $c_{-1}$, respectively. Errors summed up in registers 58 or 54 exert in the opposite way and thus tend to lower $c_1$ or $c_{-1}$, respectively.

Circuit 62, 63 counterbalances the bit error rates or numbers comprised in the registers 52 to 58 in a non-linear manner. In particular, the variation of the coefficients is influenced by the BER, which is implicitly contained in the numbers stored in the registers. Specifically, a large variation is caused by large error rates, whereas a nearly errorless transmission causes small variations.

The variations are processed by an integrator circuit 64,65 to obtain coefficients $c_1$ and $c_{-1}$. The tap weights may be additionally normalized in order to maintain a constant signal amplitude if one or more of the coefficients or tap weights is altered.

Figure 7A:
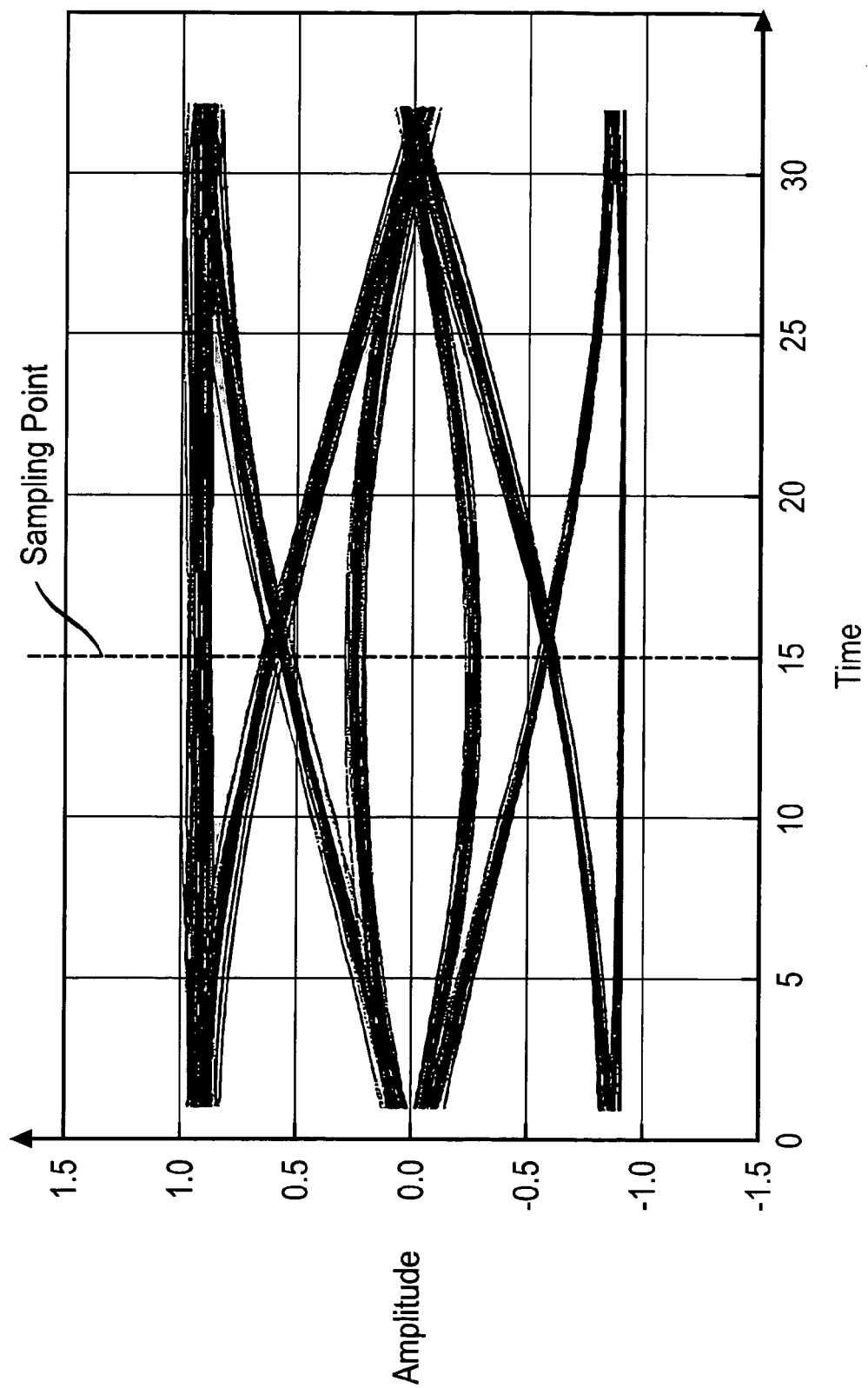
FIG. 7A shows a measured eye diagram before equalization.

Referring to FIG. 7A, a measured eye diagram of a distorted signal before equalization is shown. The signals are distorted due to optical transmission, the conversions from and to electrical signals and a low pass filter.

Figure 7B:
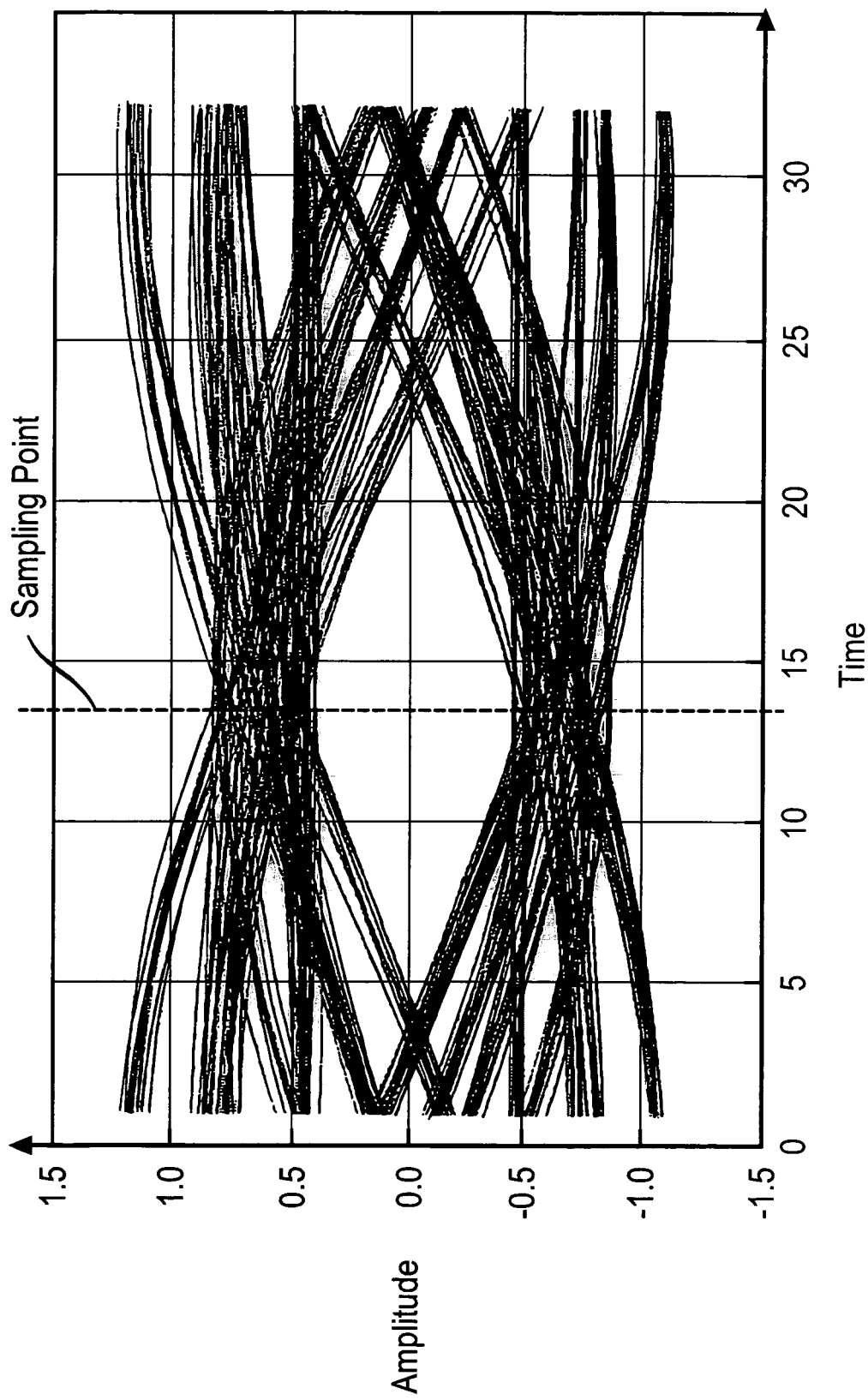
FIG. 7B shows a measured eye diagram after equalization in accordance with the invention.

FIG. 7B shows a measured eye diagram of the same signal after equalization by means of bit error rate controlled equalization parameters in accordance with the present invention. Time and amplitude are denoted in relative units. As is evident by comparison of FIGS. 7A and 7B, the eye opening is significantly enlarged after equalization. In addition, the signal amplitudes at the sampling point are approximately centered around amplitude values assigned to transmitted zeros (approximately −0.75) and ones (approximately +0.75), whereas the signals exhibit different signal amplitudes at the sampling point before equalization.

Although the invention has been described with reference to exemplary embodiments and accompanying drawings, it can be readily understood that the invention is not restricted to such embodiments. Those of ordinary skill in the art will recognize that various changes and modifications can be made without departing from the spirit and scope of the invention, as defined in the appended claims.

We claim:

1. A method of signal equalization of a transmitted bit stream by means of a feed forward equalizer, comprising the steps of:
    decomposing said signal into at least two components,
    determining conditional bit error rates by counting corrected faulty-received bits dependent on preceding and succeeding bits,
    tuning equalization parameters dependent on the determined conditional bit error rates,
    multiplying said components with said equalization parameters to form equalized components, and
    composing an equalized signal by superposition of said equalized components;
    wherein the step of decomposing said signal comprises the step of decomposing said signal into at least three components, which are delayed with respect to each other;
    wherein the step of determining conditional bit error rates comprises the steps of:
        determining a first conditional error rate so that the values of the preceding bits are equal to the values of the corrected faulty-received bits,
        determining a second conditional error rate so that the values of the preceding bits are different from the values of the corrected faulty-received bits,
        determining a third conditional error rate whereby the values of the succeeding bits are equal to the values of the corrected faulty-received bits, and
        determining a fourth conditional error rate whereby the values of the succeeding bits are different from the values of the corrected faulty-received bits.

2. The method according to claim 1, wherein the step of tuning said equalization parameters comprises the step of independently tuning said parameters.

3. The method according to claim 1, wherein the step of tuning comprises the step of controlling the amount of variation of said equalization parameters by a total bit error rate.

4. The method according to claim 2, wherein the step of tuning comprises the steps of:
    increasing the parameter to be multiplied with the component having the smallest delay among said three components when said fourth conditional error is smaller than said third conditional error and decreasing said parameter when said fourth conditional error is larger than said third conditional error, and
    increasing the parameter to be multiplied with the component having the largest delay among said three components when said second conditional error is smaller than said third conditional error and decreasing said parameter when said second conditional error is larger than said first conditional error.

5. A receiver adapted to equalize a signal of a transmitted bit stream, said receiver comprising:
    a feed forward equalizer, the equalizer comprising decomposing means for decomposing said signal into at least two components, multiplying means for multiplying said components with independently tunable equalization coefficients, and superimposing means for superimposing said equalized components to form an equalized signal, and further comprising forward error correction means for detecting faulty-received bits, a conditional error counter which determines conditional bit error rates by counting corrected faulty-received bits in dependence of preceding and succeeding bits, and tuning means adapted to tune said equalization coefficients dependent on said conditional bit error rates;
    wherein the decomposing means comprise delay means for time delaying said at least two components with respect to each other;
    wherein said signal is decomposed into three components, and wherein said conditional error counter determines a first conditional error rate of faulty-received bits when the values of the preceding bits are equal to the values of the corrected faulty-received bits, a second conditional error rate of faulty-received bits when the values of the preceding bits are different from the values of the corrected faulty-received bits, a third conditional error rate of faulty-received bits when the values of the succeeding bits are equal to the values of the corrected faulty-received bits, and a fourth conditional error rate of faulty-received bits when the values of the succeeding bits are different from the values of the corrected faulty-received bits.

6. The receiver according to claim 5, wherein said tuning means comprise means for retrieving the total bit error rate and means for controlling the amount of variation of said equalization parameters dependent on a total bit error rate.

7. The receiver according to claim 5, wherein said tuning means increase the parameter to be multiplied with the component having the smallest delay among said three components when said fourth conditional error is smaller than said third conditional error and decrease said parameter when said fourth conditional error is larger than said third conditional error, and increase the parameter to be multiplied with the component having the largest delay among said three components when said second conditional error is smaller than said third conditional error and decrease said parameter when said second conditional error is larger than said first conditional error.

* * * * *